P. ALLEN.
UNION.
APPLICATION FILED OCT. 22, 1913.

1,110,280.

Patented Sept. 8, 1914.

Witnesses.
Albert G. Pieczynkowski
Norma Davidson

Inventor.
Philip Allen
By Horatio E. Bellows
Attorney.

UNITED STATES PATENT OFFICE.

PHILIP ALLEN, OF PROVIDENCE, RHODE ISLAND.

UNION.

1,110,280. Specification of Letters Patent. Patented Sept. 8, 1914.

Application filed October 22, 1913. Serial No. 796,617.

*To all whom it may concern:*

Be it known that I, PHILIP ALLEN, a citizen of the United States, residing at Providence, in the county of Providence and State of Rhode Island, have invented certain new and useful Improvements in Unions, of which the following is a specification.

My invention relates to unions and more particularly to unions intended for use as gas hose connections.

Heretofore the connection of a flexible tube or hose to a gas or other fitting has involved either the use of a brazed sleeve, or the flexible tube has been drawn over the exterior surfaces of the shank or pipe tail piece thereby unduly stretching and weakening and fracturing the material of the hose. Heretofore, also, connections of this type have, after some use, leaked.

The objects of my invention are essentially to provide a simple and effective means of applying a flexible member to a metal fixture; to provide a means readily adapted to receive and firmly hold the hose without stretching or fracture; to insure such an engagement of the pipe tail piece and hose piece as to prevent any leaking at the joint; to provide means for guiding and centering the hose end tail piece with relation to the pipe end tail piece; and to obtain these ends in an inexpensive and easily operable structure.

To the above end primarily my invention relates to such parts and combination of parts as fall within the scope of the appended claims.

Figure 1:
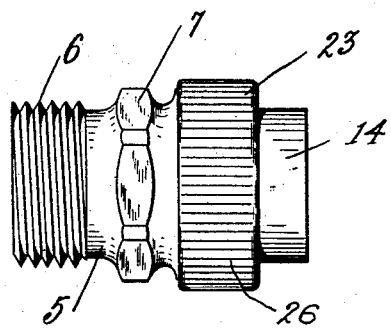
Figure 2:
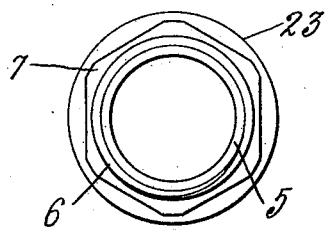
Figure 3:
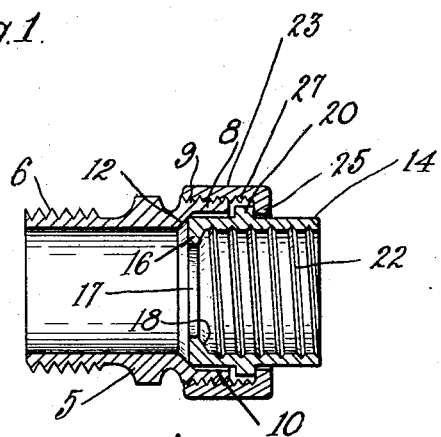
Figure 4:
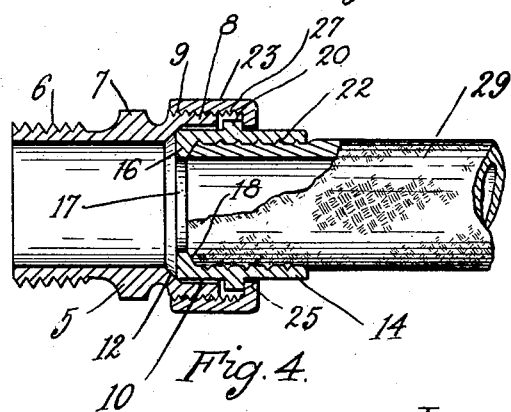

In the accompanying drawings wherein like reference characters indicate like parts throughout the views; Figures 1 and 2 are side and end elevations respectively of my novel union. Fig. 3, a longitudinal central section of the same, and Fig. 4, a similar section of the same with the end portion of a hose or tube inserted.

In detail my device comprises a coupling member or pipe end piece 5, preferably of brass, provided upon its outer end with external thread 6, and upon an intermediate portion of its exterior with an hexagonal rib 7. The inner end of the member 5 is preferably of larger diameter than the other end as at 8, and has an external screw thread 9. This portion of the coupling 5 has a cylindrical bore as at 10 extending some distance into the member, and terminates in a beveled or conical shoulder 12 which constitutes a seat. The recessed or bored portion 10 and the seat 12 are adapted for the accommodation of the companion member or tail end piece 14 having upon its inner end an inturned flange 16 surrounding a central circular opening 17, and having an inclined or beveled inner face or annular shoulder 18. Upon the exterior of the cylindrical member 14, intermediate its length, is an annular shoulder 20. The member 14 is also provided with an internal coarse thread 22, extending throughout its length.

The described members 5 and 14 are adapted to be connected by means of a coupling ring 23 provided with an inturned annular shoulder 25, and provided upon its exterior with knurls 26 or otherwise roughened. The interior of the ring is provided with threads 27 adapted to engage the threads 9 upon the member 5. The shoulder 25 is adapted to engage the shoulder 20, so that the tightening of the ring 23 is adapted to force the member 14 inwardly along the bore 10, and bring the angular end 16 of the hose end tail piece into contact with the beveled seat 12 of the pipe end tail piece. This beveled seat insures a guide and centering means for the member 14 relatively to the member 5, and the recess formed by the bore 10 is of sufficient depth to insure a complete engagement of the member 14. When the members of the union are disassembled this recess serves to protect the seat 12 from becoming scratched or otherwise injured by contact with other pieces during handling or shipment. The member 14 has inserted within it the flexible gas tube or hose 29, which insertion is manually effected by turning the member 29 into the member 14 whereby the coarse threads 22 engage the flexible surface of the pipe as it travels to the shoulder 18 where its progress is checked.

It will be observed that the members 5, 14, and 23 constitute a self-contained union fitting directly connecting the hose to the pipe fitting, and avoiding the use of any auxiliary cap or other means for connecting the hose end with the union.

What I claim is:—

1. In a hose connection, the combination of a pipe tail piece provided with exterior threads upon its end, and provided with a longitudinal recess in the same end, an inclined seat at the inner end of the recess, a hose tail piece, an annular shoulder upon an intermediate portion of the hose tail piece, said hose tail piece being provided with internal coarse threads, a coupling ring provided with threads adapted to engage the threads upon the pipe tail piece, and an annular shoulder upon the ring adapted to engage the shoulder upon the hose tail piece.

2. In a hose coupling, the combination of a pipe tail piece provided with external threads upon one end, and provided with external threads upon the opposite, inner end, and provided with a longitudinal recess in the inner end, a bevel seat in the inner end of the pipe tail piece, a hose tail piece slidably mounted in the first tail piece having an end adapted to abut against the seat, an inclined annular shoulder in the inner end of the hose tail piece, the latter piece being provided with internal coarse threads, an annular shoulder upon the exterior of the hose tail piece, a coupling ring provided with internal threads adapted to engage the threads upon the inner end of the pipe tail piece, and a shoulder upon the coupling ring adapted to engage the shoulder upon the hose tail piece.

In testimony whereof I affix my signature in presence of two witnesses.

PHILIP ALLEN.

Witnesses:
 CHARLES S. JENCKES,
 HORATIO E. BELLOWS.

Copies of this patent may be obtained for five cents each, by addressing the "Commissioner of Patents, Washington, D. C."